United States Patent
Ivans et al.

(10) Patent No.: US 12,208,909 B2
(45) Date of Patent: Jan. 28, 2025

(54) AIRCRAFT WITH BIFURCATED AIR INLET

(71) Applicant: Bell Textron Inc., Fort Worth, TX (US)

(72) Inventors: Steven Ray Ivans, Ponder, TX (US);
David Alan Hawthorne, Colleyville, TX (US); Bradley Robert Henson, Mansfield, TX (US); David Frank Haynes, Arlington, TX (US); David Lawrence Miller, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/563,908

(22) Filed: Sep. 8, 2019

(65) Prior Publication Data
US 2021/0070461 A1    Mar. 11, 2021

(51) Int. Cl.
| B64C 33/02 | (2006.01) |
| B64D 27/14 | (2006.01) |
| B64D 33/02 | (2006.01) |
| F02C 7/04  | (2006.01) |

(52) U.S. Cl.
CPC .............. *B64D 33/02* (2013.01); *B64D 27/14* (2013.01); *B64D 2033/0226* (2013.01); *F02C 7/04* (2013.01)

(58) Field of Classification Search
CPC ....................................................... F02C 7/04
See application file for complete search history.

(56) References Cited

U.S. PATENT DOCUMENTS

| 2,618,119 | A | * | 11/1952 | Redding | F02C 7/32 60/802 |
| 2,721,715 | A | * | 10/1955 | Hoadley | F02C 7/04 244/130 |
| 4,938,021 | A | * | 7/1990 | Jones | F02C 7/04 60/788 |
| 5,150,569 | A | * | 9/1992 | Chapman | F02K 3/00 244/135 R |
| 6,584,764 | B2 | * | 7/2003 | Baker | B64D 33/02 137/15.1 |
| 9,234,460 | B2 | * | 1/2016 | Lamb, Jr. | F02C 7/04 |
| 2010/0230530 | A1 | * | 9/2010 | Nannoni | B64D 33/02 244/17.11 |
| 2015/0122954 | A1 | * | 5/2015 | Lamb, Jr. | F02C 7/042 244/76 R |
| 2016/0025005 | A1 | * | 1/2016 | Jones | F02C 7/06 416/245 R |
| 2017/0268409 | A1 | * | 9/2017 | Thomassin | B64D 27/10 |
| 2018/0208323 | A1 | * | 7/2018 | Parsons | B64D 33/02 |
| 2021/0140367 | A1 | * | 5/2021 | Tantot | B64D 27/24 |

* cited by examiner

*Primary Examiner* — Michael H Wang
(74) *Attorney, Agent, or Firm* — Lightfoot & Alford PLLC

(57) ABSTRACT

A rotorcraft has a fuselage, an engine disposed substantially laterally centrally relative to the fuselage, and an air intake system (AIS). The AIS has a first duct configured to provide streamline air flow, a second duct configured to provide streamline air flow, and a combining section configured to receive streamline air flow from each of the first duct and the second duct. The combining section is further configured to output streamline air flow.

16 Claims, 18 Drawing Sheets

AIRCRAFT WITH BIFURCATED AIR INLET

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Current generation tiltrotor aircraft are typically configured using a dual turbine engine arrangement, with each engine mounted in wing tip rotating nacelles with rotor, transmission, exhaust, and other systems. This general arrangement allows for the efficient integration of engine air induction systems, where air can be drawn from an external ram air intake, with minimal distance and duct length needed from ram intake to the engine compressor inlet. In this arrangement, smooth laminar flow can be maintained with minimal turbulence and duct friction losses, thereby maximizing recovery of high dynamic pressure of the external free stream at the engine compressor inlet. High pressure recovery (ratio of dynamic air pressure at the compressor plane divided by the dynamic pressure in the external free stream) is necessary for maximizing engine power and fuel efficiency, and is a critical design requirement for achieving high speed and long range operational objectives with tiltrotor aircraft.

Many variations of next generation tiltrotor aircraft are being considered, including single engine configurations with an engine centered laterally about the fuselage. With this arrangement, it is necessary to route the air flow path around gearbox or drive system components located in front of the engine, and there is typically much greater distance between the engine inlet compressor and suitable locations for the externally mounted air intakes, resulting in much longer air ducts and associated pressure recovery losses.

Dual intakes for single and multiple engine helicopters are common, and are typically configured using an air plenum chamber between the external air intake and the engine inlet compressor. With this arrangement, the expansion of air upon entry to the plenum can result in turbulence, circulation, and other losses contributing to lower pressure recovery at the engine inlet. These losses contribute to reduced engine power and efficiency. For typical helicopter speed and range objectives, these losses are acceptable. However, with more aggressive tiltrotor operational characteristics noted and for higher performance rotorcraft in general, these losses have a greater impact and a more efficient air induction system is needed.

Many types of tiltrotor aircraft exist, and the engines of tiltrotor aircraft have been successfully provided in a variety of locations. Engines of some tiltrotor aircraft have been provided in rotating nacelles on wings, in stationary locations on wings, and within fuselages. More recently, some tiltrotor aircraft have been provided with a single engine located substantially laterally centered. In some cases, such as when a single laterally centered engine disposed at least partially within a fuselage is a turboshaft engine having a compressor with high air input needs, providing air to the engine is more challenging than when the engine is located outside the fuselage. More specifically, in tiltrotor aircraft with a single engine located generally centrally within the fuselage, routing air ducts to the engine can be difficult. Routing the air ducts can be especially difficult in cases where the tiltrotor aircraft is a smaller than typical form factor, such as, but not limited to, a small unmanned aerial vehicle (UAV) in which the engine and drive train components are tightly packaged within the small fuselage. In some cases, it may be desirable to provide multiple air flow paths to a compressor of an engine.

Accordingly, there exists a need for an air intake system for rotorcraft (both tiltrotor and future helicopters) that can provide one or more of (1) sufficient air flow to the engine compressor during operation in a hover flight regime, (2) routing of air ducts around an obstruction and to a compressor of a laterally centered engine, and (3) ram air benefits to a compressor of a laterally centered engine.

BRIEF DESCRIPTION OF THE DRAWINGS

Prior Art

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
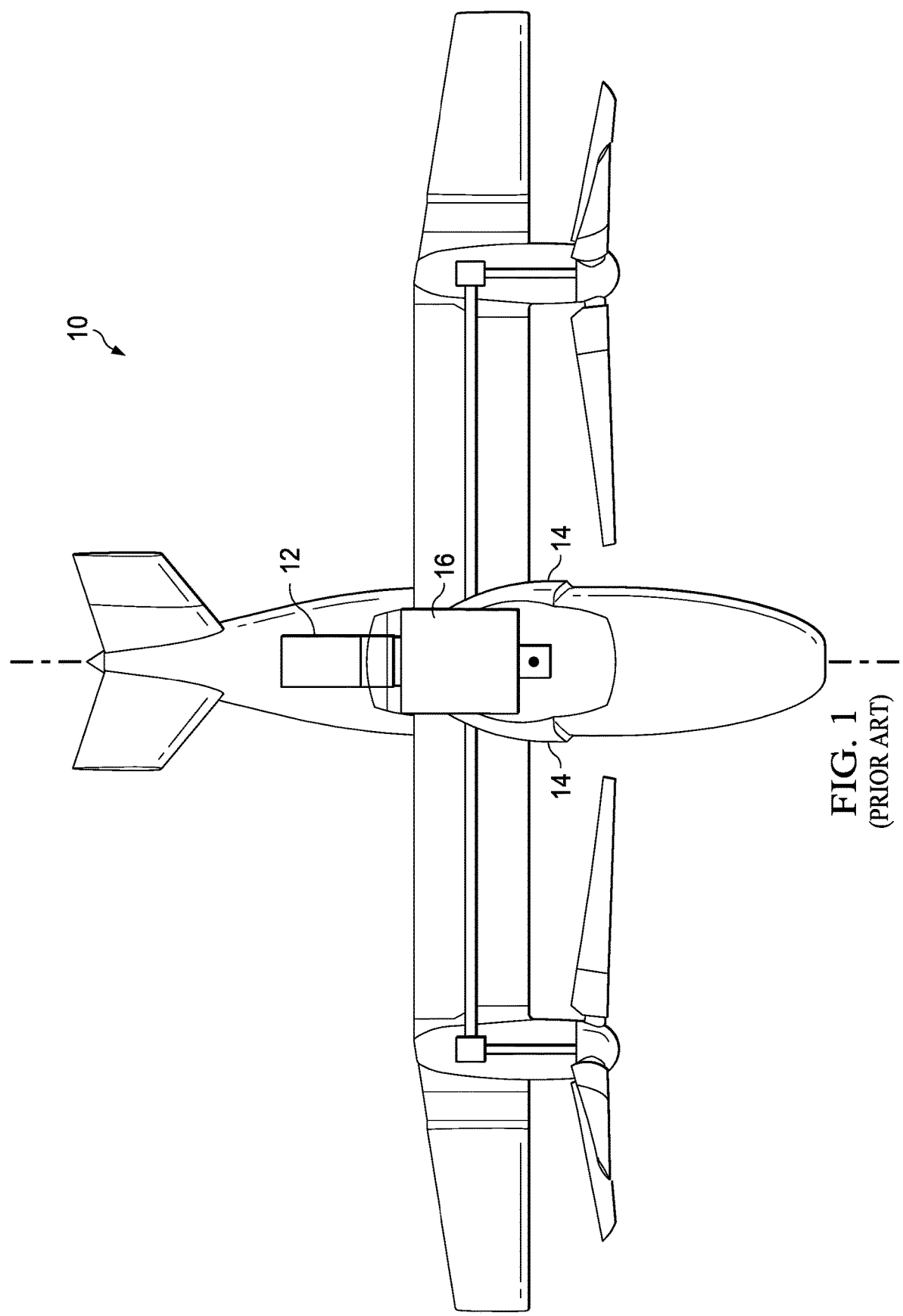
FIG. 1 is a top view of an aircraft comprising a conventional air intake system.

Referring now to Prior Art FIG. 1, an aircraft 10 is shown that comprises a single engine 12, two air intakes 14, and a plenum 16 configured to mix and homogenize air from the two air intakes before feeding air to the engine 12. The plenum 16 feature shown decreases recovered dynamic pressure and results in decreased engine power and efficiency.

Figure 2:
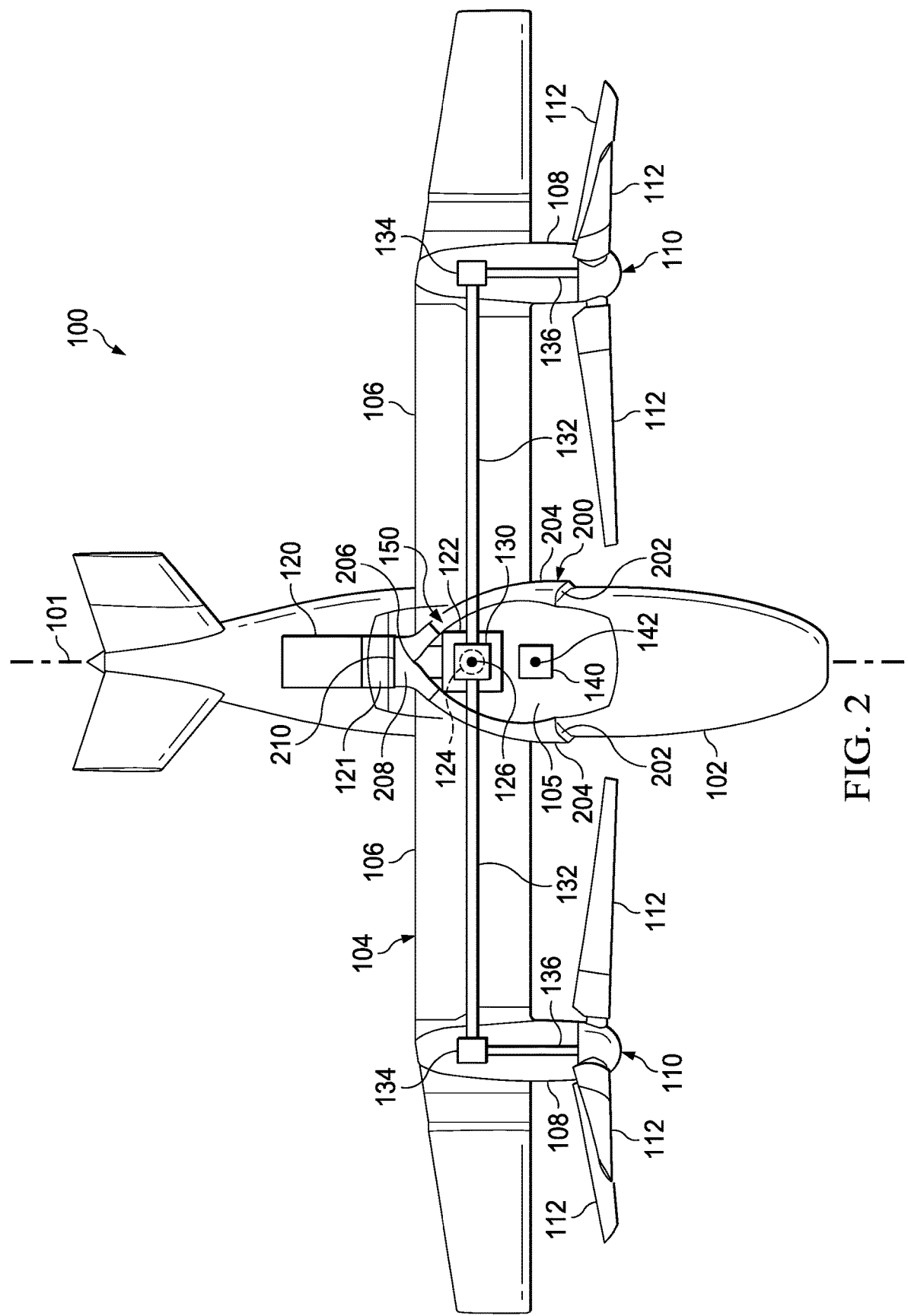
FIG. 2 is a top view of an aircraft comprising an air intake system according to the disclosure.

Referring now to FIG. 2, a top view of an aircraft 100 is shown according to this disclosure. The aircraft of FIG. 2 does away with the use of a plenum but retains use of a single engine tiltrotor. As compared to the aircraft 10, recovered dynamic pressure, engine power, and engine efficiency can be significantly increased by substitution of the plenum 16 feature with a more aerodynamically blended converging section. Key features of the converging section include smooth flow surfaces without abrupt changes in duct area and direction along flow path, with symmetric sections aligned to direct flow evenly to engine inlet compressor. These features significantly reduce the noted pressure losses associated with plenum 16, and provide more even flow velocity and pressure distributions at radial and circumferential locations at the engine compressor inlet, necessary for meeting allowable compressor inlet distortions common with high mass flow, axial flow turbine engines.

In the embodiment shown, aircraft 100 is a tiltrotor having a laterally centered plane 101 that, when viewed from above, divides the aircraft 100 into a left portion and a right portion (or a port side and starboard side). However, in other embodiments, aircraft 100 may be any other type of aircraft (e.g. fixed-wing aircraft, vertical takeoff and landing (VTOL) aircraft, "manned" or "unmanned" drone, etc.). Aircraft 100 generally comprises a fuselage 102 and a stowable wing assembly 104 comprising a selectively rotatable wing body 105 and a plurality of wings 106 extending therefrom. Each wing 106 comprises a pylon 108 comprising a rotor assembly 110 having a plurality of rotor blades 112 coupled thereto. Each pylon 108 is selectively pivotable between a horizontal orientation and a vertical orientation with respect to the fuselage 102 and associated wing 106 to adjust the thrust angle and transition the aircraft 100 between an airplane mode and a helicopter mode. Accordingly, the airplane mode is associated with a more horizontally-oriented thrust angle and propelling the aircraft 100 forward in flight, while the helicopter mode is associated with a more vertically-oriented thrust angle and propelling the aircraft 100 to and from a landing area.

Aircraft 100 also comprises a drive component carried in the fuselage 102. In the embodiment shown, the drive component comprises an engine 120 coupled to an engine reduction gearbox ("ERGB") 122 comprising a retractable driveshaft 124. However, in other embodiments, the drive component may comprise a direct-drive electric motor, a direct-drive engine, a motor and gearbox combination, or an engine and a redirection gearbox, each comprising a retractable driveshaft 124. In the embodiment shown, operation of the engine 120 causes the retractable driveshaft 124 to rotate about its rotation axis 126. The retractable driveshaft 124 is selectively extended and retracted axially along rotation axis 126 to engage and disengage from an auxiliary or mid-wing gearbox 130 disposed within the selectively rotatable wing body 105 of the wing assembly 104. The mid-wing gearbox 130 is operatively coupled to an interconnect driveshaft 132 extending therefrom through each wing 106 to a pylon gearbox 134 disposed in each pylon 108. Each pylon gearbox 134 is coupled to the associated rotor assemblies 110 through a rotor mast 136. Thus, when the retractable driveshaft 124 is engaged with the mid-wing gearbox 130, rotation of the retractable driveshaft 124 imparted by the engine 120 is transmitted through the mid-wing gearbox 130 to the interconnect driveshafts 132 and the rotor masts to impart rotation to the counter-rotating rotor assemblies 110. Conversely, when the retractable driveshaft 124 is disengaged from the mid-wing gearbox 130, rotation of the retractable driveshaft 124 will not impart rotation to the rotor assemblies 110. As such, the retractable driveshaft 124 allows the engine 120 to operate to run pre-flight checks, provide electrical power, and/or provide functions of an auxiliary power unit (APU) without engaging the rotor assemblies 110.

In some embodiments, aircraft 100 may also comprise a wing assembly rotation system 140 configured to selectively rotate the wing assembly 104 with respect to the fuselage 102 about stow axis 142. Most notably, the stow axis 142 is offset from the rotation axis 126 of the retractable driveshaft 124. More specifically, the stow axis 142 is displaced longitudinally along a length of the fuselage 102 with respect to the rotation axis 126 of the retractable driveshaft 124. In some embodiments, the offset between the stow axis 142 and rotation axis 126 may be about twelve inches. The location of the rotation axis 126 is generally set by the location of the interconnect driveshafts 132 and/or the mid-wing gearbox 130. The stow axis 142 is generally selected to center the wing assembly 104 over the fuselage 102, thereby reducing the overall footprint of the aircraft 100 when the wing assembly 104 is fully rotated. Further, in some embodiments, offsetting the stow axis 142 towards a more forward portion of the wing assembly 104 may provide structural benefits, such as allowing rotation of the wing assembly 104 in a thicker, more structurally rigid portion of the wing assembly 104. Additionally, as will be discussed further herein, it will be appreciated that since the retractable driveshaft 124 extends at least partially into the wing body 105 of the wing assembly 104 when the retractable driveshaft 124 is engaged with the mid-wing gearbox 130, the retractable driveshaft 124 is configured to accommodate the misalignment of the retractable driveshaft 124 and the stow axis 142 by selectively disengaging from the mid-wing gearbox 130. Accordingly, it will be appreciated that the gearbox 122 comprising the retractable driveshaft 124, the mid-wing gearbox 130, and the wing assembly rotation system 140 may be referred to collectively as a stow system 150.

Figure 3:
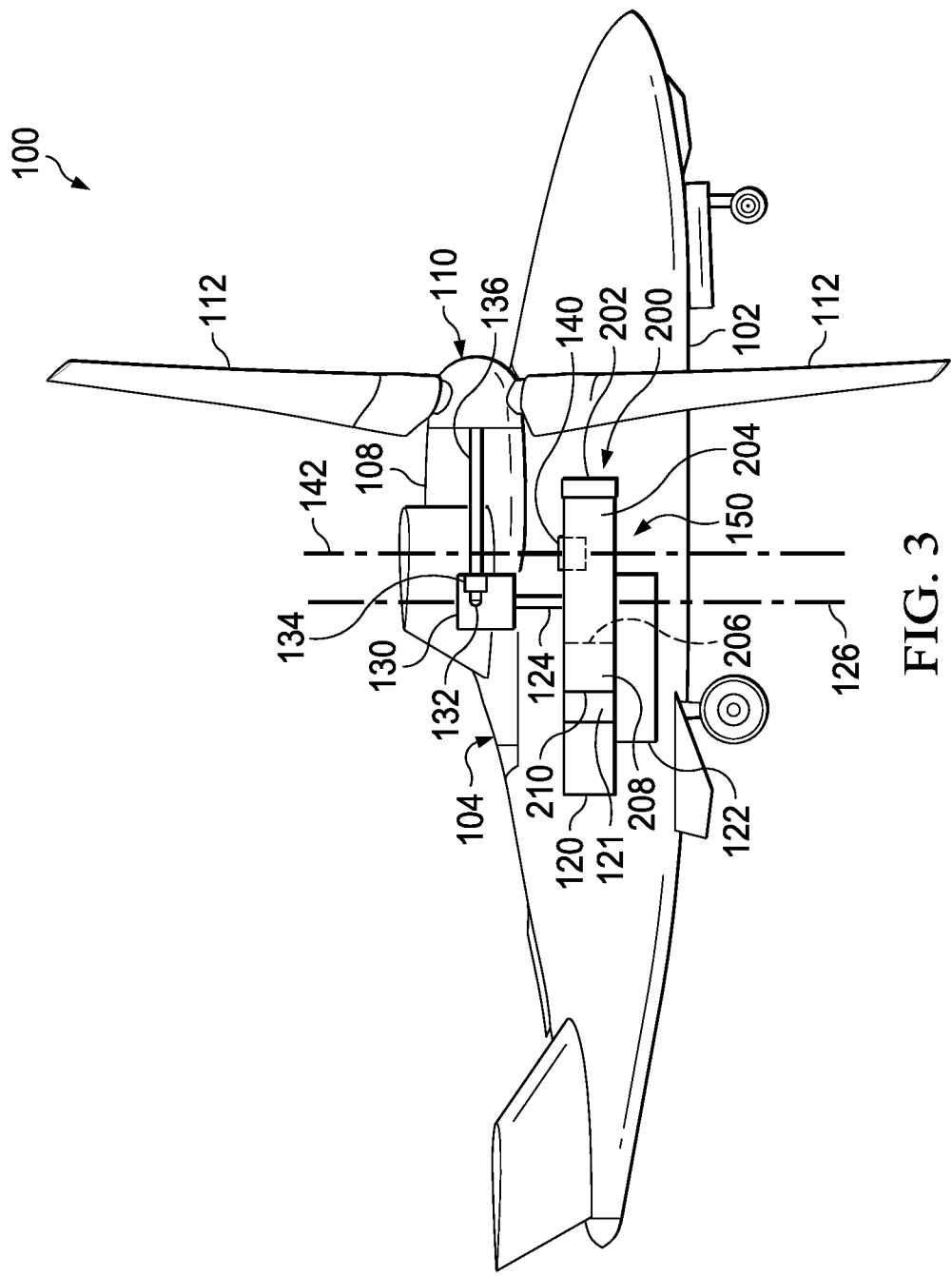
FIG. 3 is a side view of the aircraft of FIG. 2.

Referring now to FIG. 3, a side view of the aircraft 100 of FIG. 2 is shown according to this disclosure. Aircraft 100 is shown with the retractable driveshaft 124 engaged with the mid-wing gearbox 130 and wing assembly 104 configured in a flight position. As shown, the retractable driveshaft 124 is selectively extended vertically to engage the mid-wing gearbox 130 when the wing assembly 104 is configured in the flight position. Thus, when the retractable driveshaft 124 is engaged with the mid-wing gearbox 130, rotational motion of the retractable driveshaft 124 imparted by the engine 120 is transferred through the mid-wing gearbox 130 to the interconnect driveshafts 132 and the rotor masts to impart rotation to the counter-rotating rotor assemblies 110 to selectively propel the aircraft 100.

Figure 4:
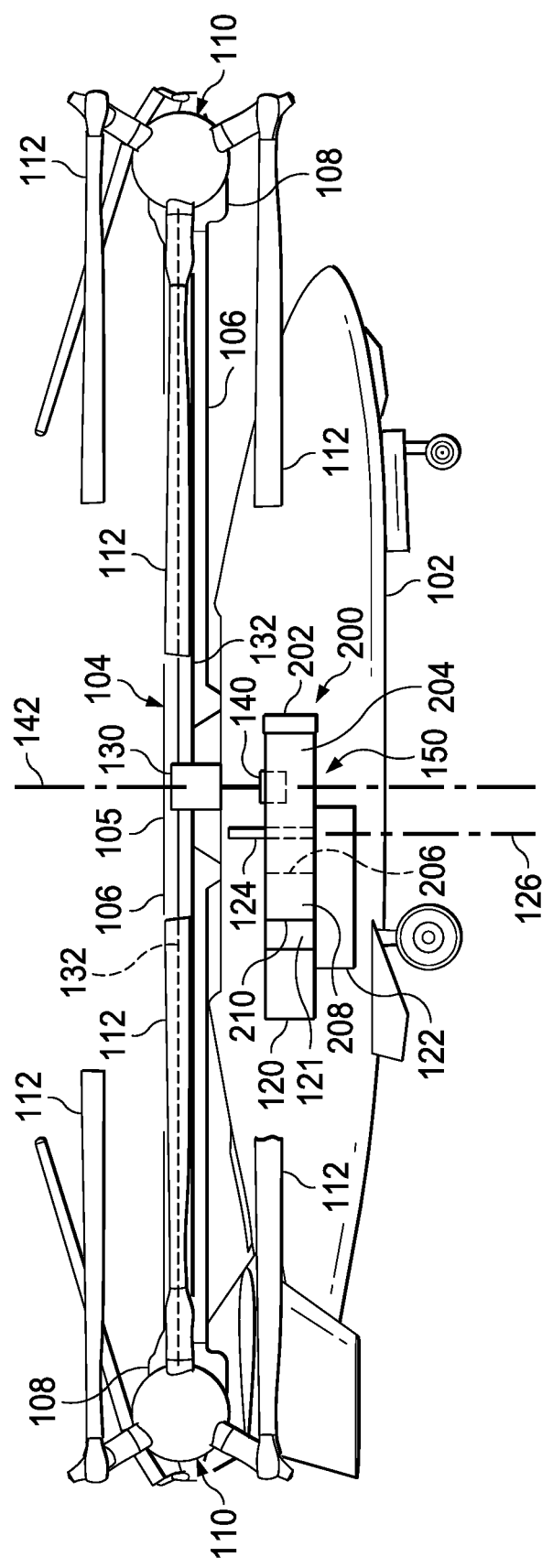
FIG. 4 is a side view of the aircraft of FIG. 2.

Referring now to FIG. 4, a side view of the aircraft 100 of FIG. 2 is shown according to this disclosure. Aircraft 100 is shown with the retractable driveshaft 124 disengaged with the mid-wing gearbox 130 and wing assembly 104 configured in a stowed position. As shown, the retractable driveshaft 124 is selectively retracted vertically to disengage the mid-wing gearbox 130. After the retractable driveshaft is disengaged from the mid-wing gearbox 130, the wing assembly 104 may be selectively rotated relative to the fuselage 102 about the stow axis 142 in a clockwise direction as viewed from the top of the aircraft 100 until the wing assembly 104 reaches the stowed position. In the stowed position, it will be appreciated that the retractable driveshaft 124 is misaligned from the mid-wing gearbox 130. In some embodiments, the stowed configuration of the wing assembly 104 may be reached after the wing assembly 104 is rotated about ninety degrees. Furthermore, in some embodiments, it will be appreciated that the wing assembly 104 may be rotated relative to the fuselage 102 about the stow axis 142 in a counter-clockwise direction.

Figure 5A:
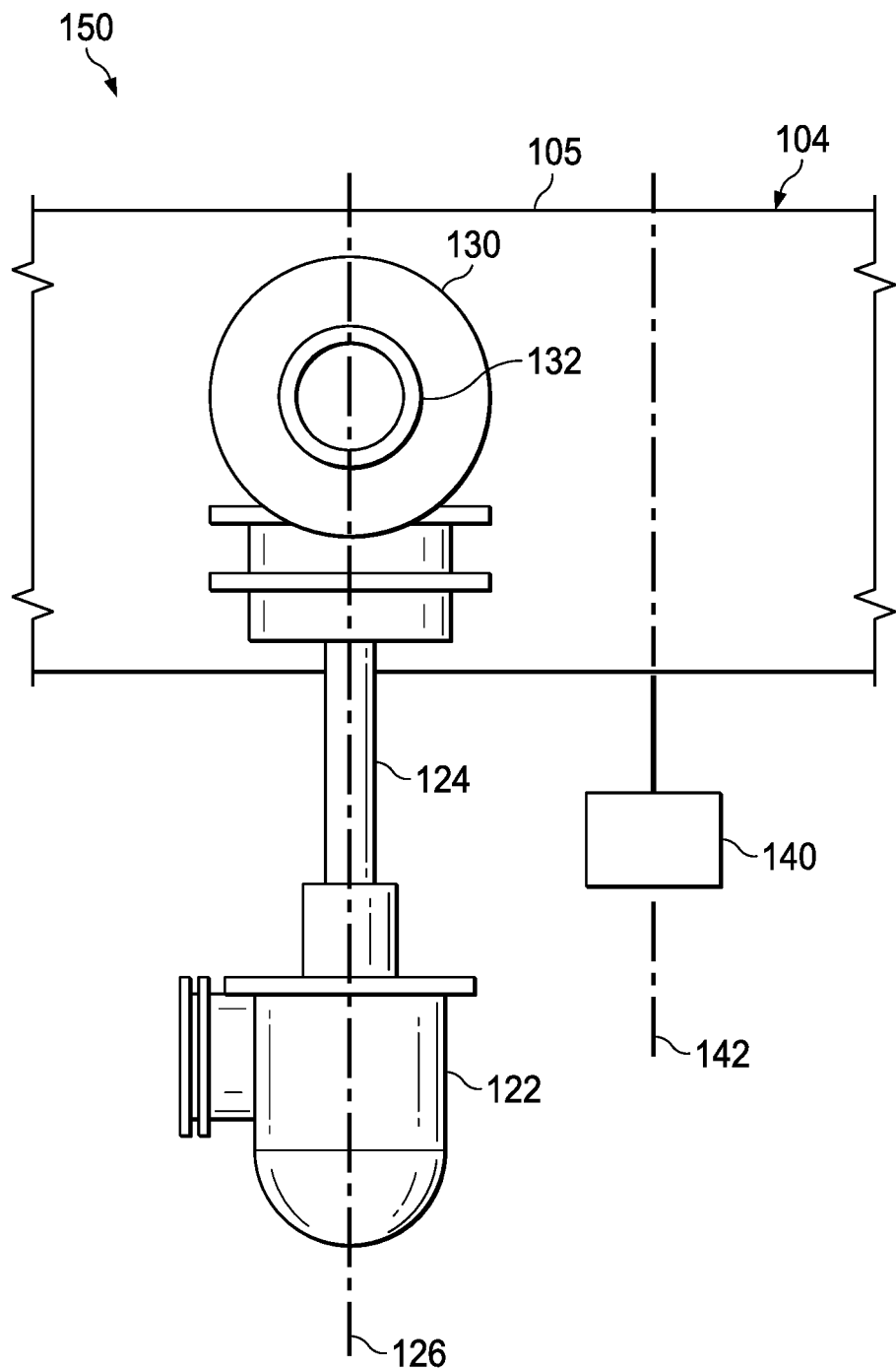
FIG. 5A is a detailed side view of a stow system of the aircraft of FIG. 2 in a first configuration.
Figure 5B:
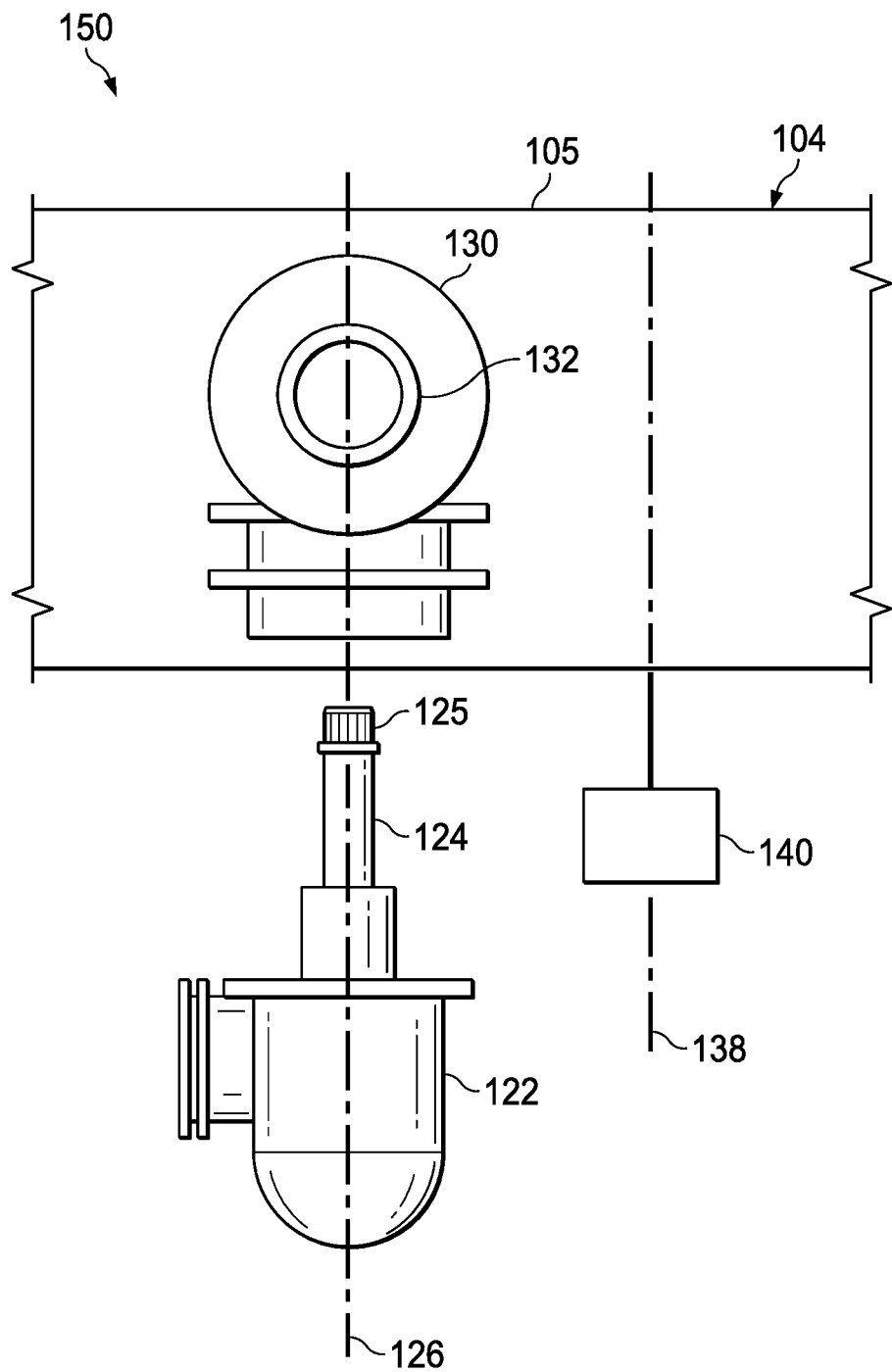
FIG. 5B is a detailed side view of the stow system of FIG. 5A in a second configuration.
Figure 5C:
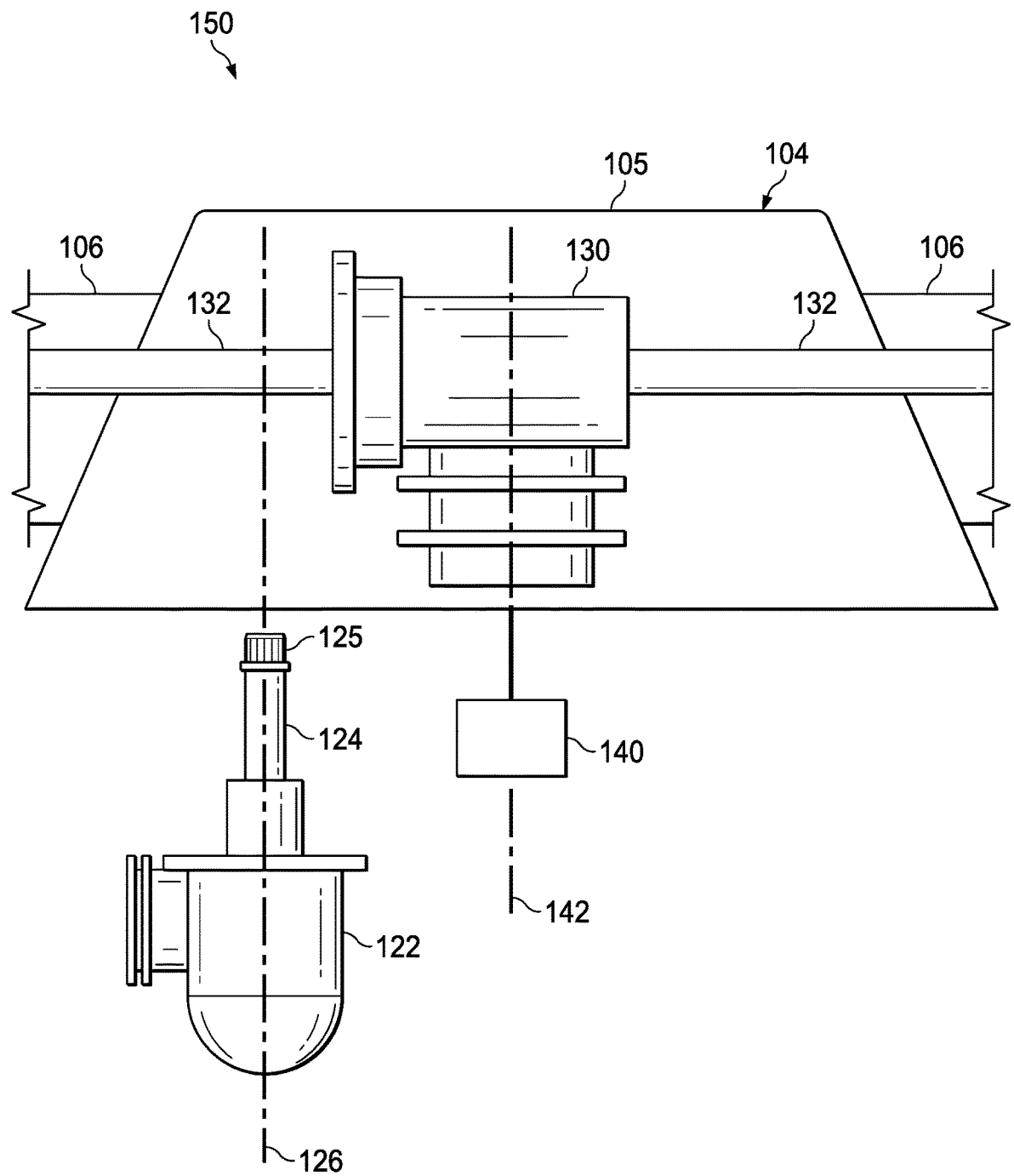
FIG. 5C is a detailed side view of the stow system of FIG. 5A in a third configuration.

Referring now to FIGS. 5A-5C, detailed side views of the stow system 150 of the aircraft 100 of FIGS. 2-4 are shown according to this disclosure. More specifically, FIG. 5A shows the retractable driveshaft 124 engaged with the mid-wing gearbox 130 and the wing assembly 104 configured in the flight position, FIG. 5B shows the retractable driveshaft 124 disengaged from the mid-wing gearbox 130 and the wing assembly 104 configured in the flight position, and FIG. 5A shows the retractable driveshaft 124 disengaged from the mid-wing gearbox 130 and the wing assembly 104 rotated about the stow axis 142 and configured in the stowed position. It will be appreciated that the retractable driveshaft 124 and the mid-wing gearbox 130 comprise an interface designed to properly align splines 125 of the retractable driveshaft 124 and the mid-wing gearbox 130 when the retractable driveshaft 124 is being selectively extended to engage the mid-wing gearbox 130.

In operation, the retractable driveshaft 124 is selectively extended and retracted to engage and disengage from, respectively, the mid-wing gearbox 130 disposed in the wing body 105 of the wing assembly 104. The retractable driveshaft 124 may be actuated electrically, electro-mechanically, hydraulically, and/or mechanically. For example, in some embodiments, the retractable driveshaft 124 may be extended and retracted by a rack and pinion. However, in other embodiments, the retractable driveshaft 124 may be extended and retracted by a machine screw type system. When the retractable driveshaft 124 is engaged with the mid-wing gearbox 130 as shown in FIG. 5A, the retractable driveshaft 124 may be selectively retracted to a retracted position as shown in FIG. 5B. After the retractable driveshaft 124 is retracted, the wing assembly 104 may be selectively rotated relative to the fuselage 102 about the stow axis 142 until the wing assembly 104 reaches the stowed position as shown in FIG. 5C. Once the stow system 150 of aircraft 100 is configured as shown in FIGS. 4 and 5C, the aircraft 100 may be parked, stowed, and/or driven into an entrance of a hangar while reducing the overall footprint of the aircraft 100, thereby allowing for more compact storage of aircraft 100 and increased storage capacity of multiple aircrafts 100. Furthermore, from the stowed position shown in FIG. 5C, the wing assembly 104 may be selectively rotated relative to the fuselage 102 about the stow axis 142 until the wing assembly 104 reaches the flight position as shown in FIG. 5B. Thereafter, the retractable driveshaft 124 may be selectively extended to engage the mid-wing gearbox 130 as shown in FIGS. 3 and 5A, where the aircraft 100 is configured for flight.

Referring to FIGS. 2-4, the aircraft 100 further comprises an air intake system (AIS) 200. To minimize these losses, AIS 200 has air intakes disposed as close to the engine as possible, minimizes bends and transitions along the air flow path. This is accomplished by using a dual intake system, symmetrically mounted on sides of fuselage, ahead of the wing, or at other suitable locations providing optimal routing of air flow path. FIG. 2 shows an embodiment for a single engine tiltrotor application. A plenum feature shown decreases recovered dynamic pressure and results in decreased engine power and efficiency. These losses can be significantly reduced by substitution of the plenum feature with a more aerodynamically blended converging section, as shown in FIG. 3 and FIG. 4. Key features of the converging section include smooth flow surfaces without abrupt changes in duct area and direction along flow path, with symmetric sections aligned to direct flow evenly to engine inlet compressor. These features significantly reduce the noted pressure losses associated with plenum arrangement, and provide more even flow velocity and pressure distributions at radial and circumferential locations at the engine compressor inlet, necessary for meeting allowable compressor inlet distortions common with high mass flow, axial flow turbine engines.

Figure 8:
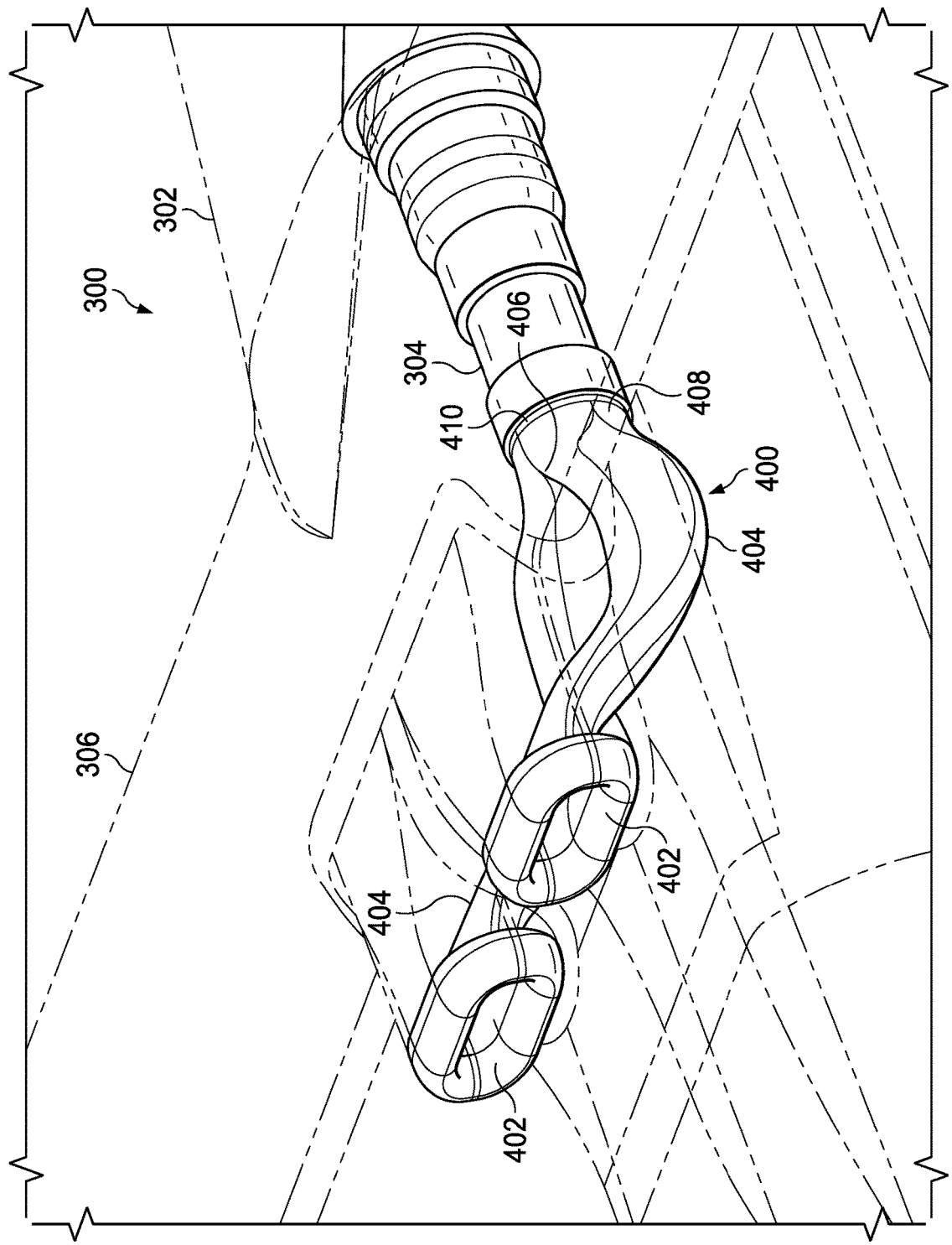
FIG. 8 is a partial oblique view of another aircraft comprising another air intake system according to the disclosure.

In the embodiment described in FIGS. 2-5, the intakes are symmetrically located on the sides of the fuselage, although can be mounted in other locations such as forward of the wing as shown in FIG. 8.

The AIS 200 comprises a plurality of air inlets 202 that serve as entrances to ducts 204. The ducts 204 are disposed at least partially within the fuselage 102 and join with each other at a crotch 206 so that the ducts 204 feed air into a combining section 208 located generally downstream relative to crotch 206 (and generally aft of the crotch 206). The combining section 208 is configured to receive streamline air flow from the ducts 204. The combining section 208 is also configured to allow the air received from the ducts 204 to continue flowing in a streamline manner (as opposed to turbulent) from the crotch 206 to an output 210 of the combining section 208. Air from the output 210 is subsequently fed to a compressor 121 of the engine 120. The combining section 208 is sized and shaped so that the combining section 208 does not act like a plenum in any significant manner. In other words, the combining section 208 maintains the above-described streamline flow of air and outputs the streamline flow of air to the compressor 121. By substantially maintaining the streamline flow of air, the AIS 200 can provide significant ram air benefits when the aircraft 100 is operated in a forward flight regime.

Figure 6:
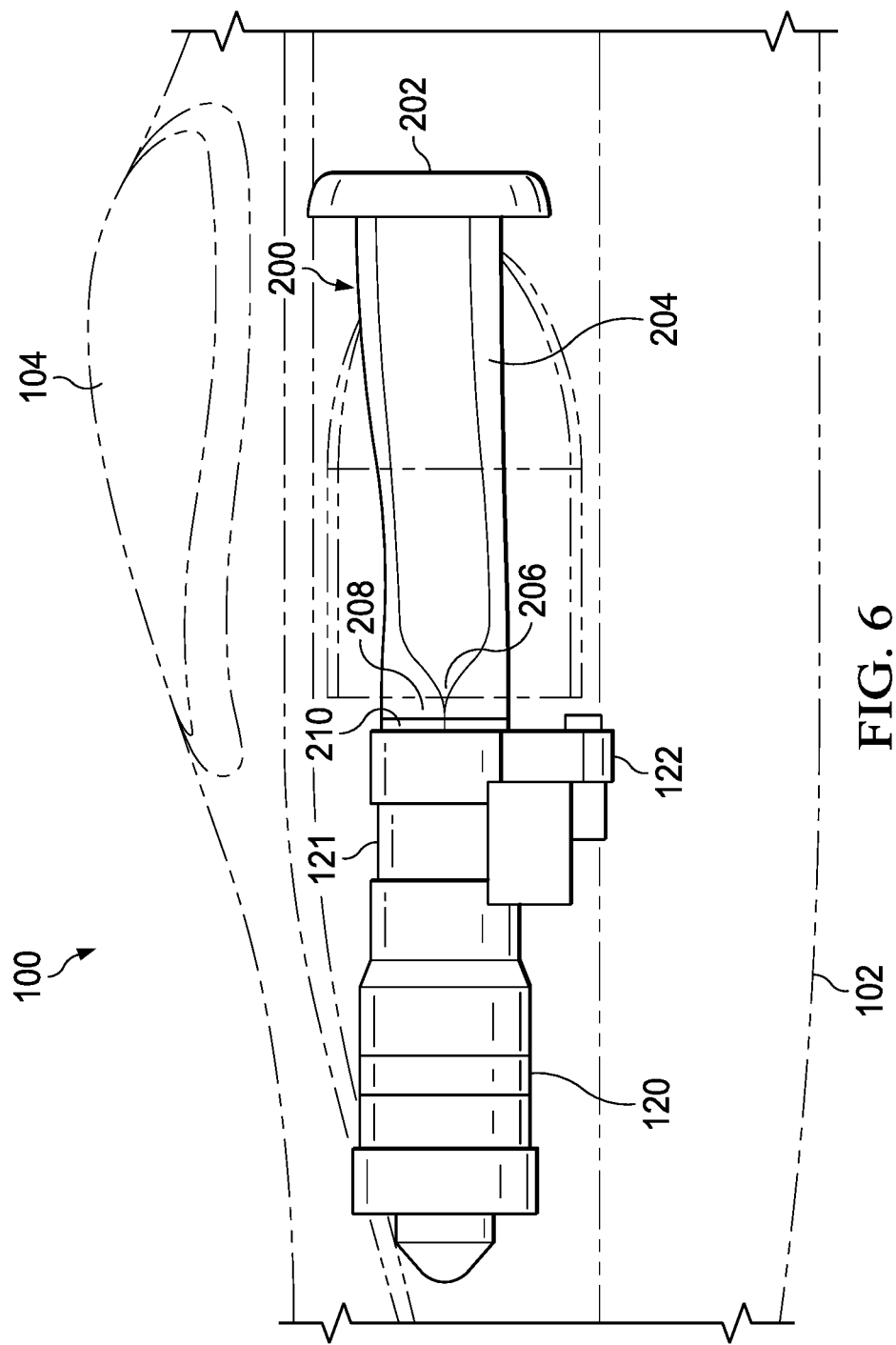
FIG. 6 is a partial side view of the aircraft of FIG. 2.
Figure 7:
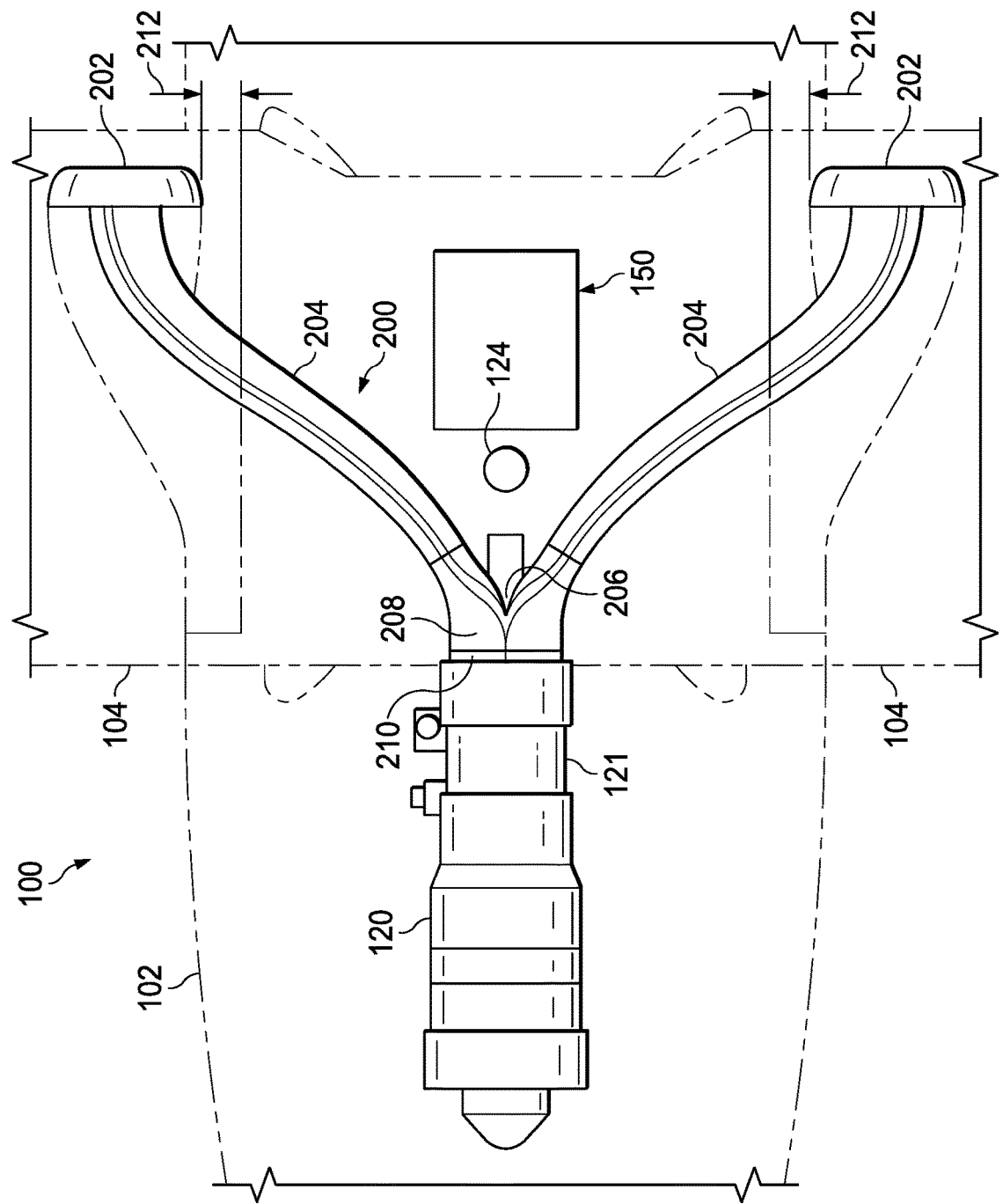
FIG. 7 is a partial top view of the aircraft of FIG. 2.

FIGS. 6 and 7 show more detailed views of the AIS 200. In this embodiment, the ducts 204 begin at air inlets 202 which extend from and are offset from the fuselage 102 by a gap distance 212. By providing the air inlets 202 in this offset manner, slower boundary layer air is not captured by the air inlets 202 during operation in the forward flight regime, thereby maximizing the ram air benefits provided by the AIS 200. Additionally, and with additional reference to FIGS. 2-4, it can be seen that a variety of components that do not form a portion of the AIS 200 are disposed laterally between the ducts 204. For example, portions of the stow system 150 are disposed laterally between the ducts 204. In this embodiment, the retractable driveshaft 124 is also disposed laterally between the ducts 204. The ducts 204 generally follow paths that mirror each other about the laterally centered plane 101, and the paths of the ducts 204 generally undulate primarily in a lateral manner without significant vertical changes. The air inlets 202 are generally disposed vertically so that they are at least partially at a same height as a portion of the engine 120 or the compressor 121. In alternative embodiments, the air inlets can be provided substantially flush with the fuselage, thereby creating a lower pressure area that draws air into the ducts rather than scooping air from directly impinging air flows.

Figure 9:
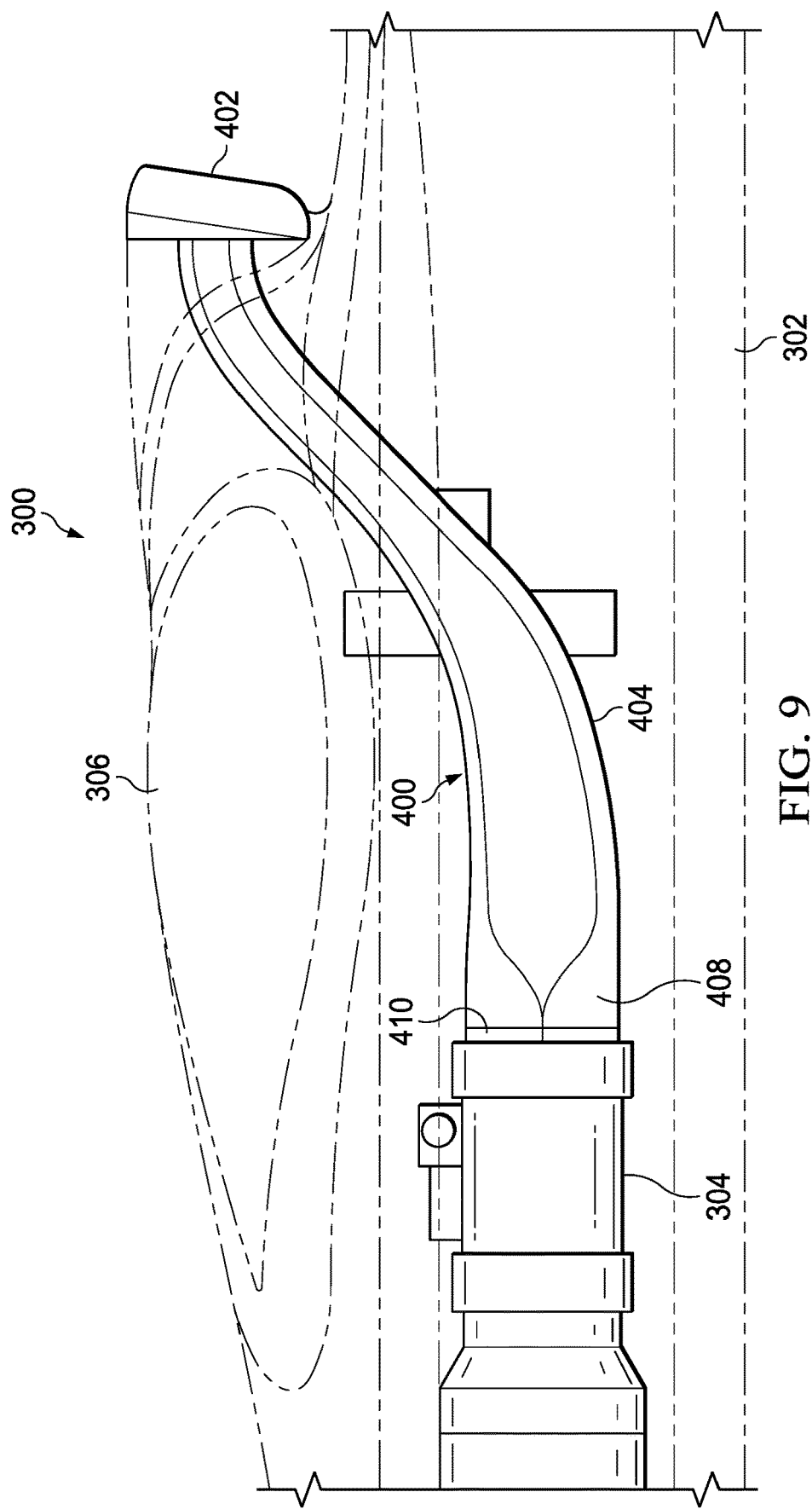
FIG. 9 is a partial side view of the aircraft of FIG. 8.
Figure 10:
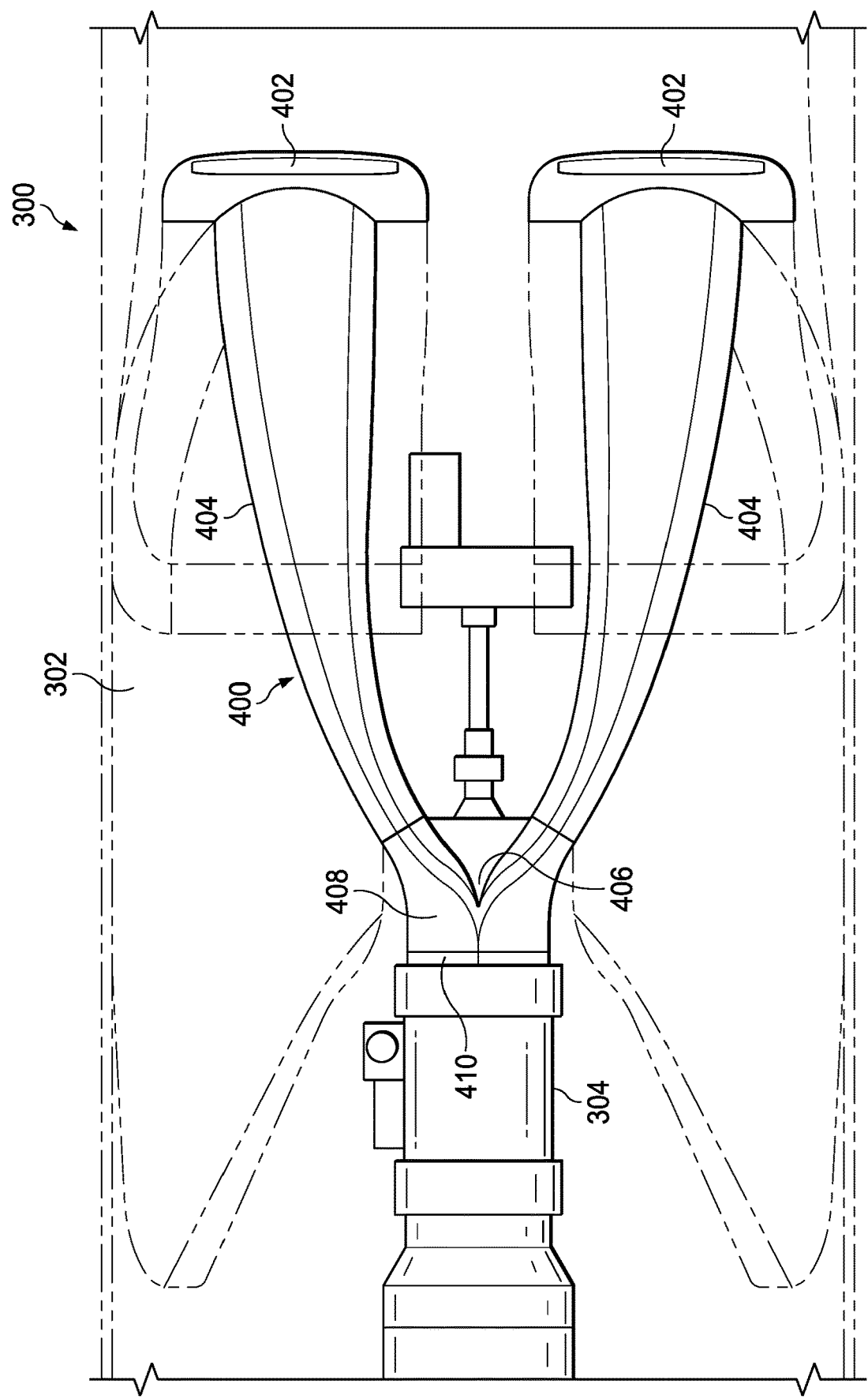
FIG. 10 is a partial top view of the aircraft of FIG. 8.

Referring now to FIGS. 8-10, a tiltrotor aircraft 300 is shown that is substantially similar to aircraft 100 but does not comprise a stow system for rotation of the wings. The tiltrotor aircraft 300 comprises another embodiment of an AIS 400. The AIS 400 is substantially similar to the AIS 200 insofar as it is substantially symmetrical about a laterally centered plane of the aircraft 300 and also provides streamline air flow output. The aircraft 300 comprises a fuselage 302 and an engine 304 disposed laterally centered and within the fuselage 302. The AIS 400 comprises air inlets 402, ducts 404, a crotch 406, a combining section 408, and an outlet 410 that operate substantially similar to the similarly named components of AIS 200. However, AIS 400 comprises ducts 404 that comprise a substantial variation in path both vertically and laterally. More specifically, the ducts 404 extend from a location well above the engine 304 and downward to the engine 304. The air inlets 402 are located side by side at least partially above the fuselage 302 and at least partially above the wings 306. This location of air inlets 402 can reduce visibility of the air inlets 402 from below which can be beneficial for preventing detection of the tiltrotor aircraft 300 in hostile environments.

Figure 11:
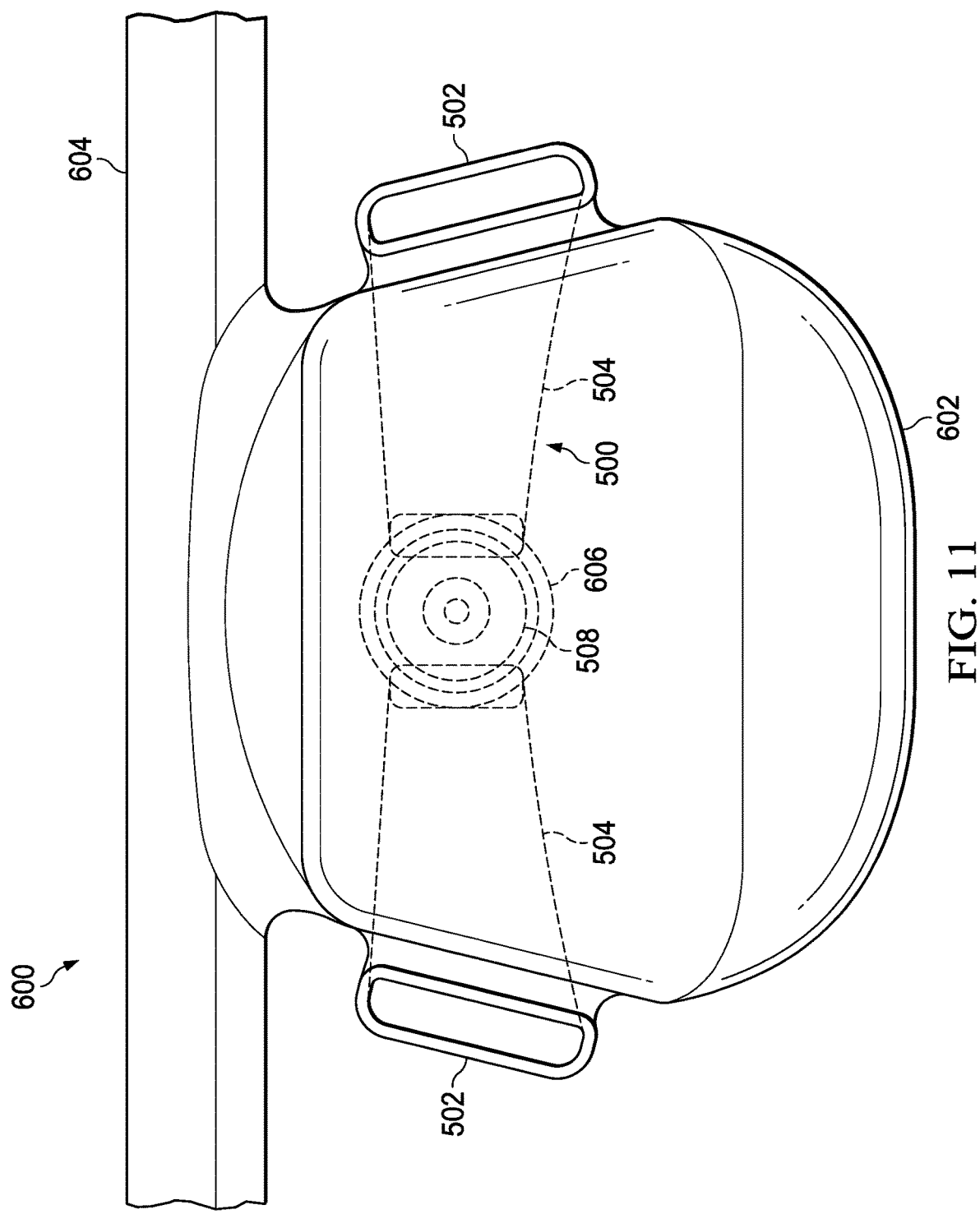
FIG. 11 is a partial front view another aircraft comprising another air intake system according to the disclosure.
Figure 12:
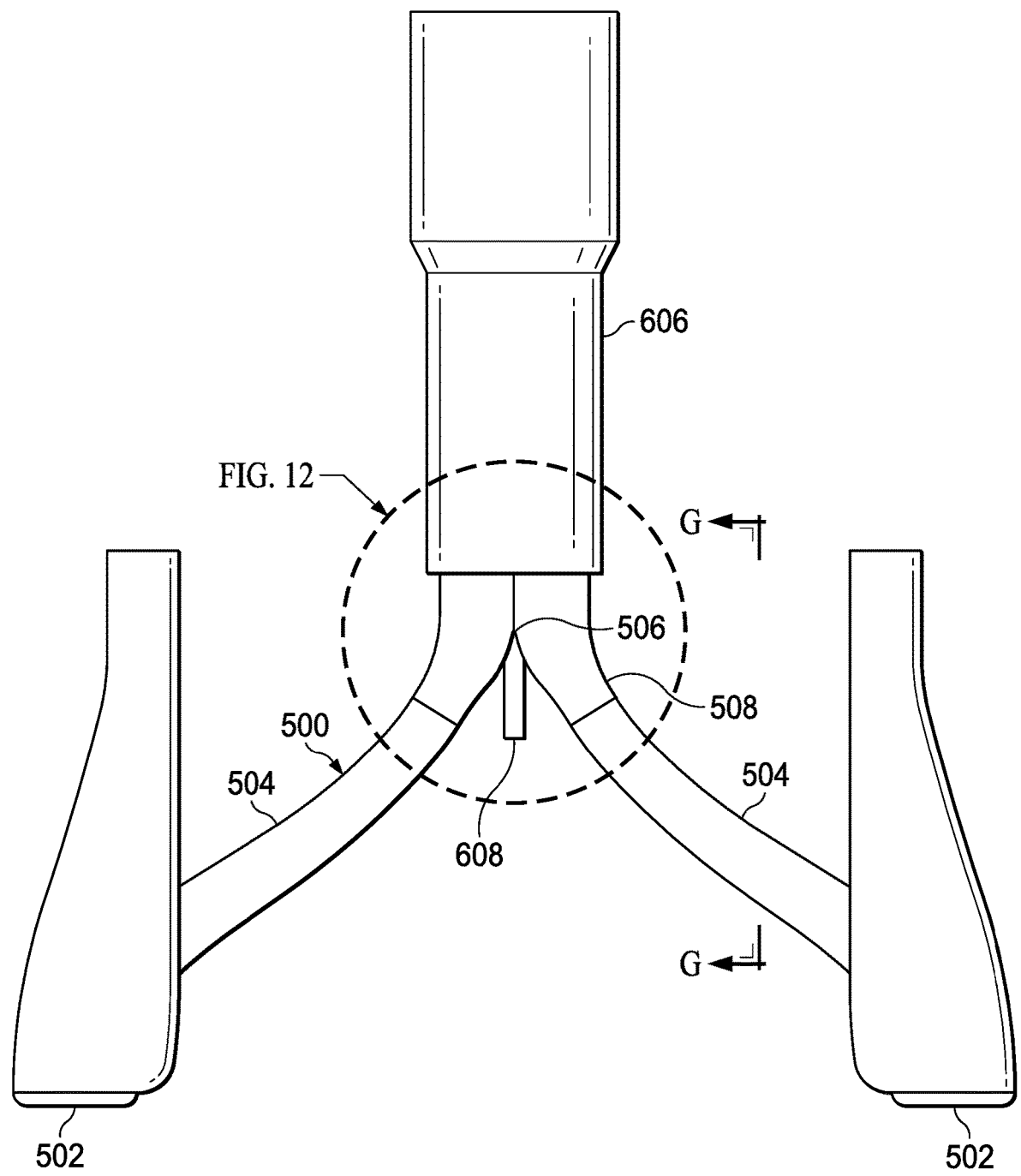
FIG. 12 is a partial top view of the aircraft of FIG. 11.

Referring now to FIGS. 11-19, an alternative embodiment of an AIS 500 is shown. The AIS 500 is configured to be disposed in an aircraft, such as aircraft 100, in a manner substantially similar to the manner in which AIS 200 is disposed within aircraft 100. FIG. 11 shows a front view of the MS 500 carried by an aircraft 600. The aircraft 600 comprises a fuselage 602, a wing 604, and an engine 606 disposed in a substantially laterally centered location that is lower than the wing 604. The engine 606 is configured to selectively rotate a shaft 608. The AIS 500 is substantially similar to the AIS 200, is substantially symmetrical about a laterally centered plane of the aircraft 600, and similarly provides a streamline air flow output. The AIS 500 comprises air inlets 502, ducts 504, a crotch 506, a combining section 508, and an outlet 510 that operate substantially similar to the similarly named components of AIS 200.

Figure 13:
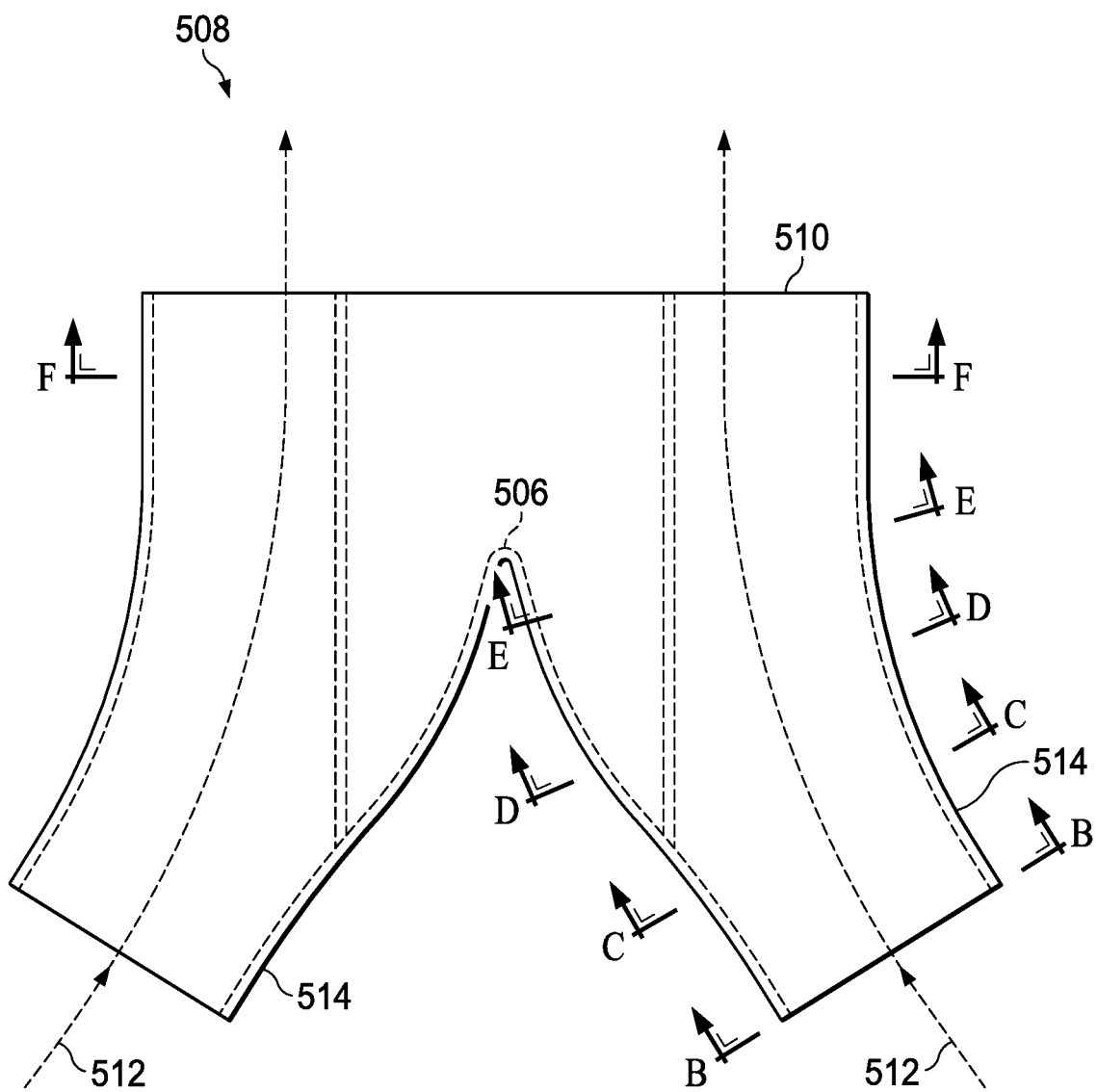
FIG. 13 is a detailed top view of the air intake system of FIG. 11.
Figure 14:
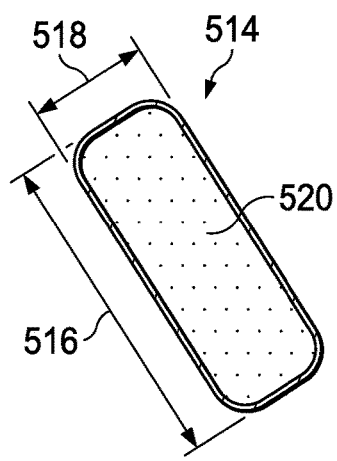
FIG. 14 is a partial cross-sectional view of the air intake system of FIG. 11 taken along cutting line B-B of FIG. 13.

FIG. 13 shows the combining section 508 in greater detail and provides cross-sectional cutting lines B-B, C-C, D-D, E-E, and F-F, the associated cross-sectional views being provided as FIGS. 14-18, respectively. FIG. 13 also includes generalized airflow streamlines 512 that indicate that air flows into the combining section 508 via two upstream unnotched leg portions 514, which are denoted as being disposed along cutting line B-B and shown as FIG. 14. FIG. 14 shows that the upstream unnotched leg portions 514 comprise a cross-sectional area having a substantially rectangular shape having rounded corners. The cross-sectional area of the upstream unnotched leg portions 514 comprise a length 516, a width 518 shorter than the length 516, and a cross-sectional area 520 substantially matched to an associated one of the ducts 504.

Figure 15:
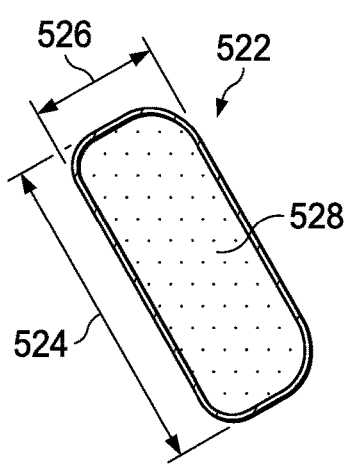
FIG. 15 is a partial cross-sectional view of the air intake system of FIG. 11 taken along cutting line C-C of FIG. 13.

FIG. 13 also shows that air flows from the upstream unnotched leg portions 514 to relatively downstream unnotched leg portions 522, an example of which is denoted as being disposed along cutting line C-C and shown as FIG. 15. FIG. 15 shows that the downstream unnotched leg portions 522 also comprise a substantially rectangular shape having rounded corners. The downstream unnotched leg portions can comprise a length 524, a width 526 shorter than the length 524, and a cross-sectional area 528. Although the dimensions of the length 524 and width 526 and associated rounded corners may be different than the length 516 and width 518 and rounded corners of upstream unnotched leg portion 514, respectively, the cross-sectional area 528 is substantially the same value as the cross-sectional area 520.

Figure 16:
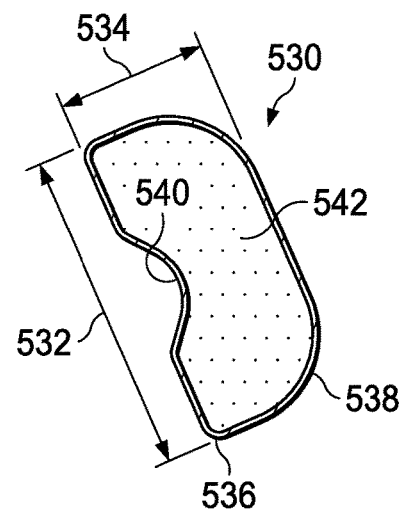
FIG. 16 is a partial cross-sectional view of the air intake system of FIG. 11 taken along cutting line D-D of FIG. 13.

FIG. 13 also shows that air flows from the downstream unnotched leg portions 522 to upstream notched leg portions 530, an example of which is denoted as being disposed along cutting line D-D and shown as FIG. 16. FIG. 16 shows that the upstream notched leg portions 530 comprise a relatively decreasingly rectangular shape as compared to upstream unnotched leg portion 514 and downstream unnotched leg portion 522. In this embodiment, the upstream notched leg portions 530 can comprise a length 532, a width 534 shorter than the length 532, decreased radius corners 536 (relative to downstream unnotched portions 522), increased radius corners 538 (relative to downstream unnotched portions 522), a shallow notch 540, and a cross-sectional area 542. While the shape of the upstream notched leg portions 530 is different than both the upstream unnotched leg portions 514 shape and downstream unnotched leg portions 522 shape, the cross-sectional area 542 is substantially the same value as the cross-sectional areas 520, 528. The shallow notch 540 is present to accommodate the substantially cylindrical space 544 that extends generally forward from the engine 606 and which accommodates the shaft 608 and/or other components exterior to combining section 508.

Figure 17:
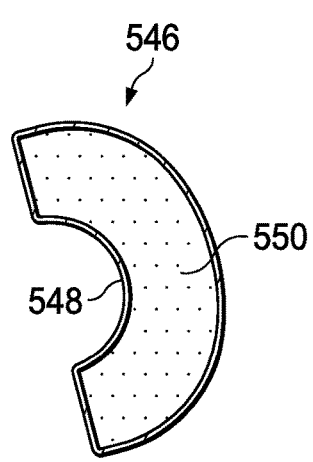
FIG. 17 is a partial cross-sectional view of the air intake system of FIG. 11 taken along cutting line E-E of FIG. 13.
Figure 18:
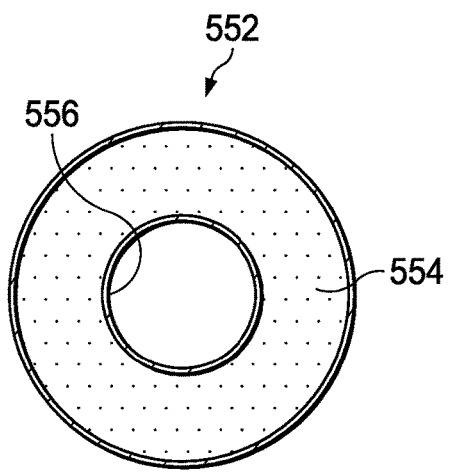
FIG. 18 is a partial cross-sectional view of the air intake system of FIG. 11 taken along cutting line F-F of FIG. 13.

FIG. 13 also shows that air flows from the upstream notched leg portions 530 to downstream notched leg portions 546, an example of which is denoted as being disposed along cutting line E-E and shown as FIG. 17. FIG. 17 shows that the downstream notched leg portions 546 comprise a relatively increasingly partial annulus shape as compared to upstream notched leg portion 530. In this embodiment, the downstream notched leg portions 546 comprise an at least partially C-shaped cross-sectional shape. The downstream notched leg portions 546 comprise a deep notch 548 that can accommodate a greater portion of the cylindrical space 544 (as compared to the shallow notch 540). This increased accommodation of the cylindrical space 544 is necessary as the airflow is being increasingly laterally centrally directed as air flows toward the engine 606. While the shape of the downstream notched leg portions 546 is different than the upstream unnotched leg portions 514 shape, the downstream unnotched leg portions 522 shape and the upstream notched leg portion 530 shape, the cross-sectional area 550 of the downstream notched leg portion is substantially the same value as the cross-sectional areas 520, 528, 542.

As air moves downstream past the downstream notched leg portions 546, the air of each of the mirrored lateral sides of the combining section 508 are combined into a single annular flow. Most generally, the airflow is transitioned from two separate but substantially equal flows of air into a single combined airflow about a fore-aft location associated with crotch 506. In other words, airflow is generally provided in two streams forward of the crotch 506 and airflow is generally provided in a single combined annular stream aft of the crotch 506. FIG. 13 shows that air flows from the downstream notched leg portions 546 to annular portions 552, an example of which is denoted as being disposed along cutting line F-F and shown as FIG. 18. While the annular portions 552 comprise different shapes relative to the portions 514, 522, 530, 546, the annular portions 552 generally comprise a cross-sectional area 554 substantially equal to two times the area 520, two times the cross-sectional area 528, two times the cross-sectional area 542, and/or two times the cross-sectional area 550. The annular portions 552 comprise form a central hole 556 sufficient to accommodate the cylindrical space 544 therethrough.

Figure 19:
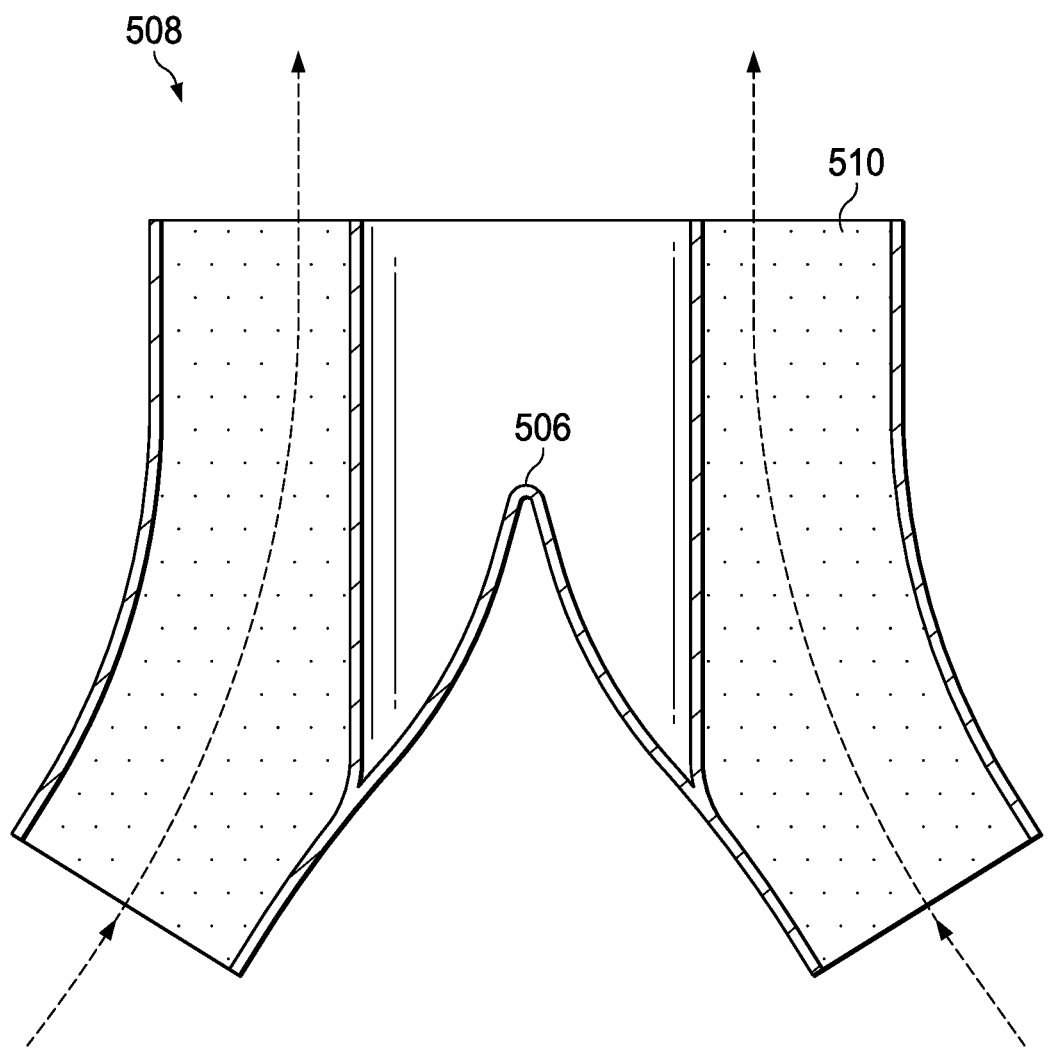
FIG. 19 is a partial top cutaway view of the air intake system of FIG. 11.

Referring now to FIG. 19, a top cutaway view of the combining section 508 is shown. FIG. 19 is helpful in illustrating that the internal surfaces of the combining section 508 are aerodynamically shaped along the flow path to minimize variations in cross-sectional area to maintain smooth flow with minimal distortion and/or losses. In this embodiment, the cross-sectional area 554 is substantially the same area as an engine 606 air inlet and/or compressor of the engine 606.

Figure 20:
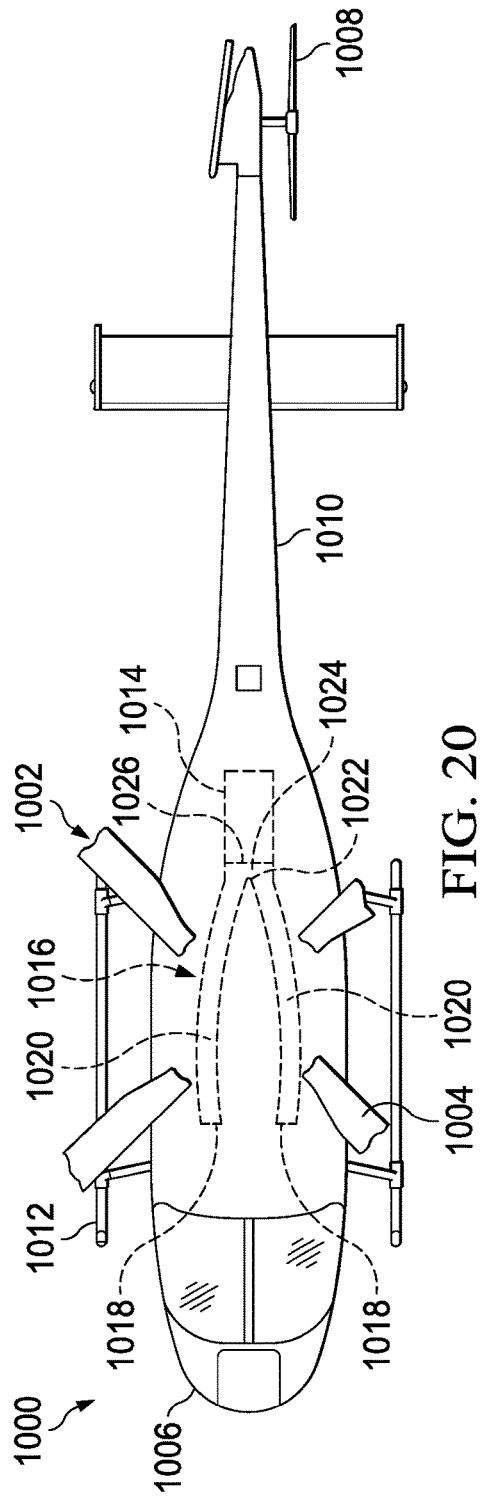
FIG. 20 is a top view of a helicopter comprising an air intake system according to the disclosure.
Figure 21:
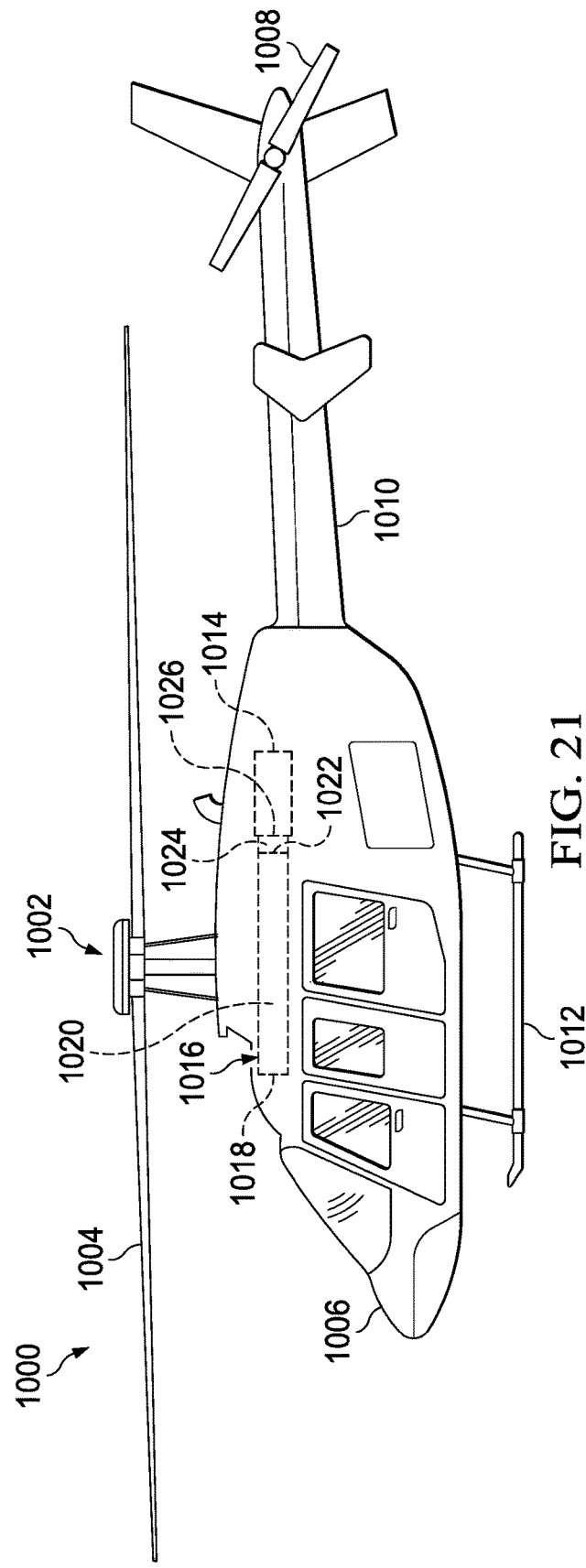
FIG. 21 is a side view of the helicopter of FIG. 20.

Referring now to FIGS. 20 and 21, a top view and a side view, respectively, of a helicopter 1000 are shown. Helicopter 1000 has a rotor system 1002 with a plurality of rotor blades 1004. The pitch of each rotor blade 1004 can be selectively controlled in order to selectively control direction, thrust, and lift of rotorcraft 1000. Rotorcraft 1000 further includes a fuselage 1006, and anti-torque system 1008, and a tailboom 1010. Rotorcraft 1000 further includes a landing gear system 1012 to provide ground support for the helicopter 1000. The helicopter further comprises an engine 1014 connected to an air intake system 1016. The air intake system 1016 is substantially similar to the AIS 200 at least insofar as it comprises air inlets 1018, ducts 1020, a crotch 1022, a combining section 1024, and an outlet 1026 that operate substantially similar to the similarly named components of AIS 200. Portions of the rotor system 1002 are not shown in FIG. 20 so that the location of the AIS 1016 can be more clearly shown.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotorcraft, comprising:
  a fuselage;
  an engine disposed substantially laterally centrally relative to the fuselage; and
  an air intake system (AIS) disposed along a central axis, comprising:
    a first duct configured to provide streamline air flow, the first inlet comprising a first inlet area and wherein the first inlet is entirely disposed laterally beyond the fuselage in a first direction by a first gap distance selected to avoid intake of boundary layer air affected by the fuselage;
    a second duct configured to provide streamline air flow, the second inlet comprising a second inlet area and wherein the second inlet is entirely disposed laterally beyond the fuselage in a second direction opposite the first direction by a second gap distance substantially equal to the first gap distance; and
    a combining section configured to receive streamline air flow from each of the first duct and the second duct, the combining section further configured to output streamline air flow;
  wherein at least a portion of the combining section comprises an annular cross-sectional shape extends to the engine from a position offset from the engine along the central axis;
  wherein the AIS is configured to prevent passage of air mixing between the first duct and the second duct prior to the air reaching the combining section and wherein the combining section outputs all air to the engine;
  wherein the AIS is configured to provide all air that enters the AIS through the first inlet and the second inlet to the engine through an outlet without discharging air downstream of either of the first inlet and the second inlet and upstream of the engine;
  wherein the sum of a first cross-sectional area of the first inlet and a second cross-sectional area of the second inlet is substantially equal to a cross-sectional area of the outlet; and
  wherein the first inlet and the second inlet are carried by the fuselage and fixed relative to the fuselage.

2. The rotorcraft of claim 1, wherein the combining section is configured to output the streamline airflow to a compressor of the engine.

3. The rotorcraft of claim 1, wherein the first duct and the second duct are substantially symmetrical about a laterally centered plane of the fuselage.

4. The rotorcraft of claim 1, wherein the first duct and the second duct extend along paths that comprise primarily lateral directional changes.

5. The rotorcraft of claim 1, wherein the first duct and the second duct extend along paths that comprise substantial vertical direction changes.

6. The rotorcraft of claim 1, the combining section further comprising:
  a first upstream unnotched leg portion comprising a first upstream unnotched leg portion cross-sectional area; and
  a second upstream unnotched leg portion comprising a second upstream unnotched leg portion cross-sectional area that is substantially the same cross-sectional area as the first upstream unnotched leg portion cross-sectional area.

7. The rotorcraft of claim 6, the combining section further comprising:
a first downstream unnotched leg portion comprising a first downstream unnotched leg portion cross-sectional area that is substantially the same cross-sectional area as the first upstream unnotched leg portion cross-sectional area.

8. The rotorcraft of claim 7, wherein a cross-sectional shape of the first downstream unnotched leg portion is different than a cross-sectional shape of the first upstream unnotched leg portion.

9. The rotorcraft of claim 6, the combining section further comprising:
a first upstream notched leg portion comprising a first upstream notched leg portion cross-sectional area, the first upstream notched leg portion being disposed downstream relative to the first upstream unnotched leg portion.

10. The rotorcraft of claim 9, wherein a cross-sectional shape of the first upstream notched leg portion is different than a cross-sectional shape of the first upstream unnotched leg portion.

11. The rotorcraft of claim 10, wherein the first upstream notched leg portion comprises a shallow notch configured to accommodate a portion of a cylindrical space extending forward from the engine.

12. The rotorcraft of claim 11, the combining section further comprising:
a first downstream notched leg portion comprising a deep notch, the deep notch being configured to accommodate a greater portion of the cylindrical space as compared to the shallow notch.

13. The rotorcraft of claim 12, the combining section further comprising:
a second downstream notched leg portion comprising a second downstream notched leg portion cross-sectional area substantially the same as a first downstream notched leg portion cross-sectional area of the first downstream notched leg portion.

14. The rotorcraft of claim 13, the combining section further comprising:
an annular portion configured to receive air from both the first downstream notched leg portion and the second downstream notched leg portion.

15. The rotorcraft of claim 14, wherein an annular portion cross-sectional area of the annular portion is substantially the same area as the sum of the first downstream notched leg portion cross-sectional area and the second downstream notched leg portion cross-sectional area.

16. The rotorcraft of claim 15, wherein the annular portion cross-sectional area is substantially the same area as an input to a compressor of the engine.

\* \* \* \* \*